United States Patent

Hatwar et al.

[11] Patent Number: 5,879,773
[45] Date of Patent: Mar. 9, 1999

[54] RECORDABLE OPTICAL DISKS WITH DIELECTRIC INTERLAYER

[75] Inventors: Tukaram K. Hatwar, Penfield; Pranab K. Raychaudhuri, Rochester; Yuan-Sheng Tyan, Webster, all of N.Y.

[73] Assignee: Eastman Kodak Company, Rochester, N.Y.

[21] Appl. No.: 971,740

[22] Filed: Nov. 17, 1997

[51] Int. Cl.[6] ........................................................ B32B 3/00
[52] U.S. Cl. ..................... 428/64.1; 428/64.2; 428/64.4; 428/64.8; 428/457; 428/913; 430/270.14; 430/495.1; 430/945; 369/283; 369/288
[58] Field of Search ................................. 428/64.1, 64.2, 428/64.4, 64.8, 457, 913; 430/270.14, 270.17, 270.19, 495.1, 945; 369/283, 288

[56] References Cited

U.S. PATENT DOCUMENTS 5,493,561  2/1996  Nishiuchi et al. .................... 369/275.1
5,633,106  5/1997  Aihara et al. .............................. 430/21

Primary Examiner—Elizabeth Evans
Attorney, Agent, or Firm—Raymond L. Owens

[57] ABSTRACT

A recordable optical disk including a transparent substrate; a recording layer formed over the substrate; a reflective layer formed over the recording layer; and a thin dielectric interlayer formed on the recording layer at the interface between the reflective layer and the recording layer wherein the thin dielectric interlayer includes materials selected from the group consisting of Ge—C—H, Si—N and InSnSb—O, the interlayer being selected so as to improve the optical disk recording stability without significantly affecting the reflection of a recording light beam passing through the substrate and the recording layer and which is reflected by the reflective layer.

5 Claims, 4 Drawing Sheets

RECORDABLE OPTICAL DISKS WITH DIELECTRIC INTERLAYER

CROSS REFERENCE TO RELATED APPLICATIONS

The present invention is related to commonly assigned U.S. patent application Ser. No. 08/971,969 filed concurrently herewith entitled "Recordable Optical Disks With Metallic Interlayer" to Hatwar et al. now allowed. The disclosure of this related application is incorporated herein by reference.

FIELD OF THE INVENTION

The present invention relates to optical disks with improved recording stability.

BACKGROUND OF THE INVENTION

Optical disks are becoming more and more prevalent for the use of recording information. One form of optical recording disks is called a CD-R or a recordable compact disk. The Photo CD is an example of this CD-R media. Typically, this type of disk has a transparent substrate, a recording layer formed on a substrate, and a reflective layer on the recording layer. The recording layer is essentially a photo absorption material made of mixture of some organic dye materials and is formed by spin coating. The recording materials used for CD-R applications have been described in U.S. Pat. Nos. 4,940,618; 5,604,004; 5,294,471; European Patent Application 0353393; and Canadian Patent 2,005,520. Commercial useful materials of the type described in these references have stringent requirements. One of these requirement is light stability. Since the Photo CD is a consumer product, it must be capable of withstanding extreme environment. The stability of the disk mainly depends on the nature of the recording layer and the reflector layer and their mutual interaction; and the protective overcoat. The above applications disclose phthalocyanine dye, metallized formazan dye and cyanine dye having excellent light stability. The reflecting layer is usually selected to be gold or a gold alloy because of its nobleness and high reflectivity. The CD-R specifications require that it has a high reflectivity of more than 60% similar to the compact disks.

During recording, writing laser light passes through the plastic substrate and is focused on the dye recording layer which is heated to change the dye material to form a mark. In other recording materials, recording pits are formed. The reflectivity of a mark is lower than in those areas not having the mark. Marks are formed as a change in the optical properties of the recording layer. In any event, the combination of some or all of these changes forms marks which can then be read back by the focused read laser beam. The record thus consists of marks of relatively low reflectivity on a background of relatively high reflectivity in relation to the read beam.

Thin layer of gold is normally used as a main reflection material in the reflective layer. It is a noble metal with a very high stability and does not introduce problems into the recording stability. When other metals which have a high reflectivity such as aluminum, silver and copper are used instead of gold, they have a problem in that they are reactive and can form oxides or other corrosive layers. The recording stability of these types of disks varies over time and degrades. However, materials such as silver are much less expensive than gold, and it would be highly desirable to use them. In fact, silver has about 5–7% higher reflectivity than gold.

SUMMARY OF THE INVENTION

It is an object of the present invention to provide an optical disk which uses a metallic reflective layer other than gold and meet the CD specifications.

These objects are achieved by a recordable optical disk comprising:
  a) a transparent substrate;
  b) a recording layer formed over the substrate;
  c) a reflective layer formed over the recording layer; and
  d) a thin dielectric interlayer formed on the recording layer at the interface between the reflective layer and the recording layer wherein the thin dielectric interlayer includes materials selected from the group consisting of Ge—C—H, Si—N and InSnSb—O, the interlayer being selected so as to improve the optical disk recording stability without significantly affecting the reflection of a recording light beam passing through the substrate and the recording layer and which is reflected by the reflective layer.

ADVANTAGES

It has been found, quite unexpectedly, that use of a thin dielectric interlayer at the interface between reflecting and recording layers can be selected so that other materials than gold such as silver can be used as a highly effective reflective layer.

Silver metal is relatively very inexpensive than gold and the disk can be manufactured at a substantially reduced cost.

Thin dielectric layers are substantially transparent, chemically stable and do not react with the silver metal. These interlayers form an effective barrier between the recording layer and the reflector layer without significantly affecting the reflectivity and other performance of the disk.

DETAILED DESCRIPTION OF THE INVENTION

Figure 1:
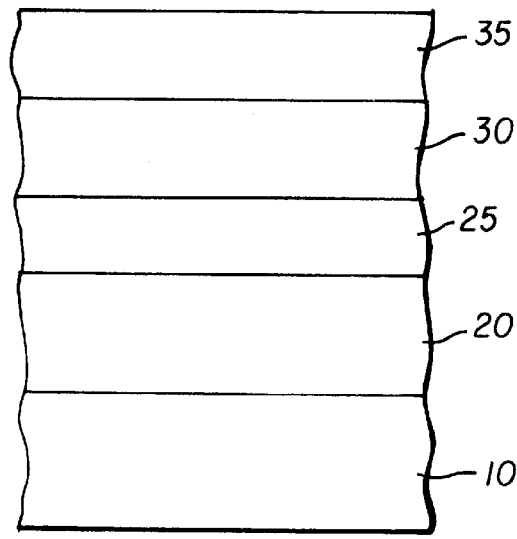
FIG. 1 shows a writable disk structure made in accordance with the present invention.

Turning to FIG. 1 is a structure of a writable storage disk made in accordance with the invention. It includes a substrate 10 which is made of polycarbonate and a dye recording layer 20. The recording layer is deposited using a spin coating technique. On the recording layer 20 is provided a reflecting layer 30 which is formed of silver. The thickness of the reflecting layer generally is between 60 to 80 nm. Between the dye recording layer and the silver metal reflector is a transparent dielectric interlayer 25 consisting of Ge—C—H, Si—N and InSnSb—O and alloys. On the metal reflector layer is provided a UV-curable lacquer protective overcoat 35. It will be understood that the protective layer 35 can actually be two layers. The first of such layer being a dielectric layer which protects the metal in the reflective layer 30 and the second layer can be a UV-curable lacquer layer on the dielectric overcoat layer.

It has been found that interlayer thickness Ge—C—H, Si—N and InSnSb—O can be effective in a range from 1 to 30 nm and are quite adequate to maintain the desired reflectivity and increase the thermal stability of the disks.

Thin films of silver reflector were deposited by sputter depositing Ag target using DC magnetron gun in an argon atmosphere. Thin films of Ge—C—H were deposited by sputter depositing Ge target in Ar and $CH_4$ atmosphere and Si—N films were prepared by sputter depositing Si target in Ar and $N_2$ atmosphere. Similarly InSnSb—O were prepared by sputter depositing InSnSb target in an atmosphere with a mixtures of argon and O2. Then the UV-curable lacquer overcoat was spin coated on the reflecting layer. These disks were tested for reflectivity, window margin, and mark jitters using Kodak PCD 600 6X writer at 7.2 m/sec.

Thin films of Ge—C—H, Si—N and InSnSb—O are substantially transparent to light beam in the wavelength range of 400–900 nm and do not have significant absorption when the film thickness is less than 100 nm. These films are chemically stable and do not react with the silver metal.

Figure 2:
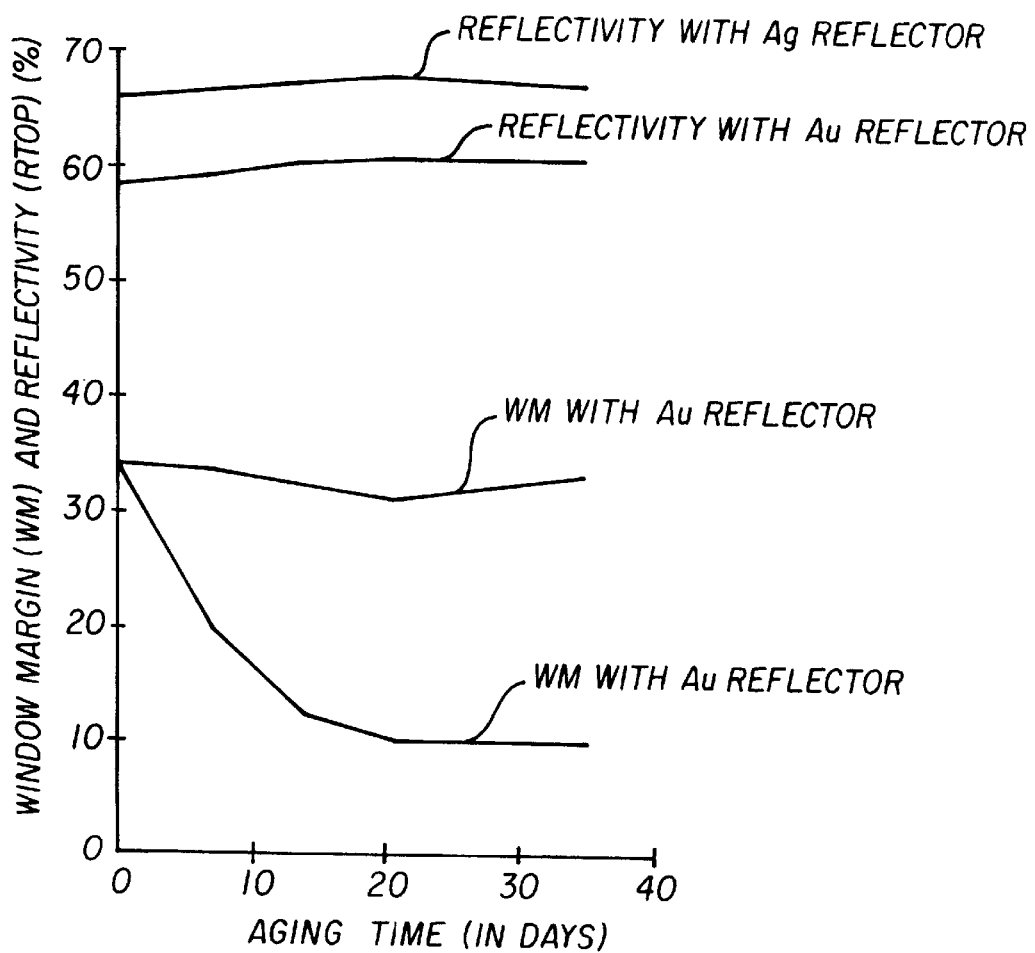
FIG. 2 shows a comparison between the two disks prepared using gold and silver metal reflectors.

Several full structure disks were prepared using different combination of interlayers and the reflectors. FIG. 2 shows the comparison of the thermal stability of the two disks prepared using gold and silver metal reflectors. Au is noble and provides a long term stability for the recording layer. Silver metal has higher reflectivity than the gold. Both disks show increase in the reflectivity as measured through the polycarbonate substrate. The window margin which is a figure of merit for these disks shows a dramatic decrease in Window Margin for the disk with the silver reflector. The Window Margin (WM) for a disk with the gold reflector indicate a slight increase or no change. Thus silver metal when directly deposited on the dye recording layer does not provide long term stability to the CD-R disk.

In general, jitter of a recorded feature is related to its ability of being detected without error during readback. Transitions from nominally identical recorded feature will not be read back precisely at the same time because of the slight variation in feature length and shape and system noise. This gives rise to a spread in detection time. A detection time window can read all these features if the distribution is so narrow as to lie completely within the time window. On the other hand, if the distribution is broad such that some of the transitions occur outside the window, they will result in a decoding error. Jitter (S) is a measure of the overall noise and is the square root of the variance of the distribution of detection time commonly modeled as a Gaussian curve. The distribution of detection time may not be exactly centered in the timing window, and the peak shift will increase the probability of a decoding error even for a narrow distribution. The window margin (WM) is a derived parameter involving jitter and peak shifts. The lower the jitter and peak shifts the higher is the WM. The WM can be viewed as a figure of merit in that the disc with higher WM has a greater probability of successful read back than the one with lower WM. Also the disc with higher WM is expected to be read back by a wider variety of readers than the one with lower WM that is otherwise similar.

The reason for the degradation of the performance for the disk using silver reflector can be seen from the small (3T) and large (11T) mark jitter as function of aging time. The 3T mark jitter decreases while 11T mark jitter increases with the aging time. There also is a phenomenon of mark growth possibly due to the interfacial interaction between the silver metal and the dye recording layer. It has been found, quite unexpectedly, that the thermal stability of the disk using silver reflector dramatically increased when a thin transparent layer of dielectric selected from the group consisting of Ge—C—H, Si—N and InSnSb—O and alloys was deposited prior to the deposition of the silver reflecting layer. Series of disk were prepared using varying thickness of the interlayer to give optimum reflectivity and the WM. Accelerated aging test were carried using 95° C. dry and 80° C. and 85% RH wet conditions.

Figure 3:
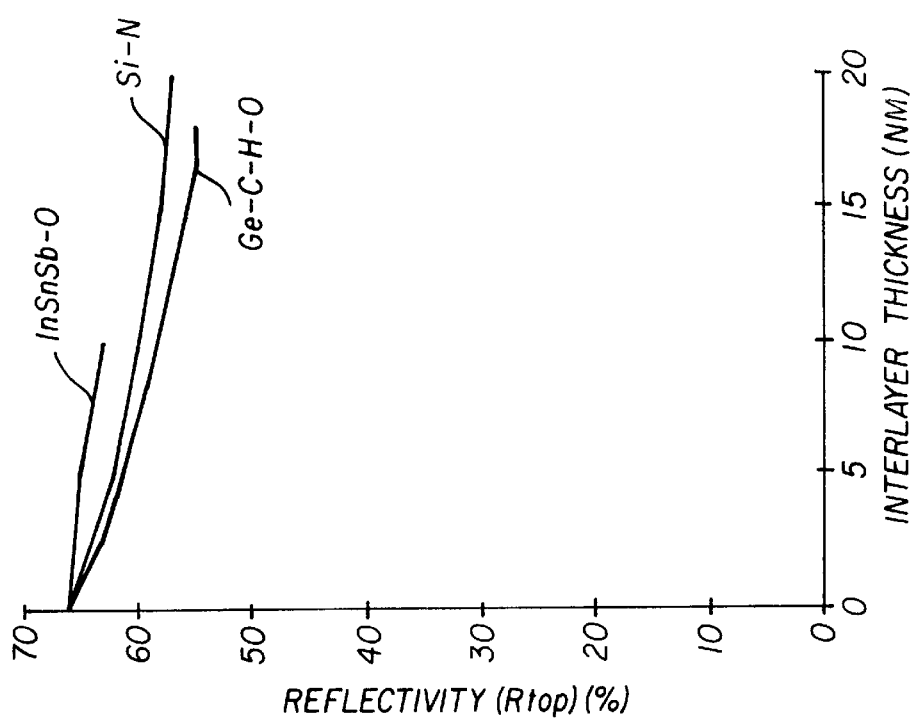
FIG. 3 is a graph of reflectivity vs. interlayer thickness for Ge—C—H, Si—N and In—Sn—Sb—O materials.

FIG. 3 shows the disk reflectivity as a function of Ge—C—H, Si—N and InSnSb—O interlayer thickness. The disk reflectivity with silver reflector and without any interlayer thickness is about 6% higher than that obtained using the gold layer as a reflector. When the thickness of interlayer was increased from 1 nm the 10 nm, the disk reflectivity decreases monotonically, but it is still higher than that obtained from the control disks with the gold reflector. When interlayer thickness is larger than 20 nm, a significant loss in the reflectivity was observed. Thus of Ge—C—H, Si—N and InSnSb—O interlayer thickness were limited to 20 nm.

Accelerated aging test were carried using two test conditions: 95° C.; and 80° C. and 85% RH. The original mark were read back after the incubation test. Disks using silver metal reflector layer, and Ge—C—H, Si—N and InSnSb—O interlayers showed significant improvement in the long term thermal stability of the disks as compared to without an interlayer in the dry testing at 95° C. and wet testing of 80° C. and 85% relative humidity.

Figure 4:
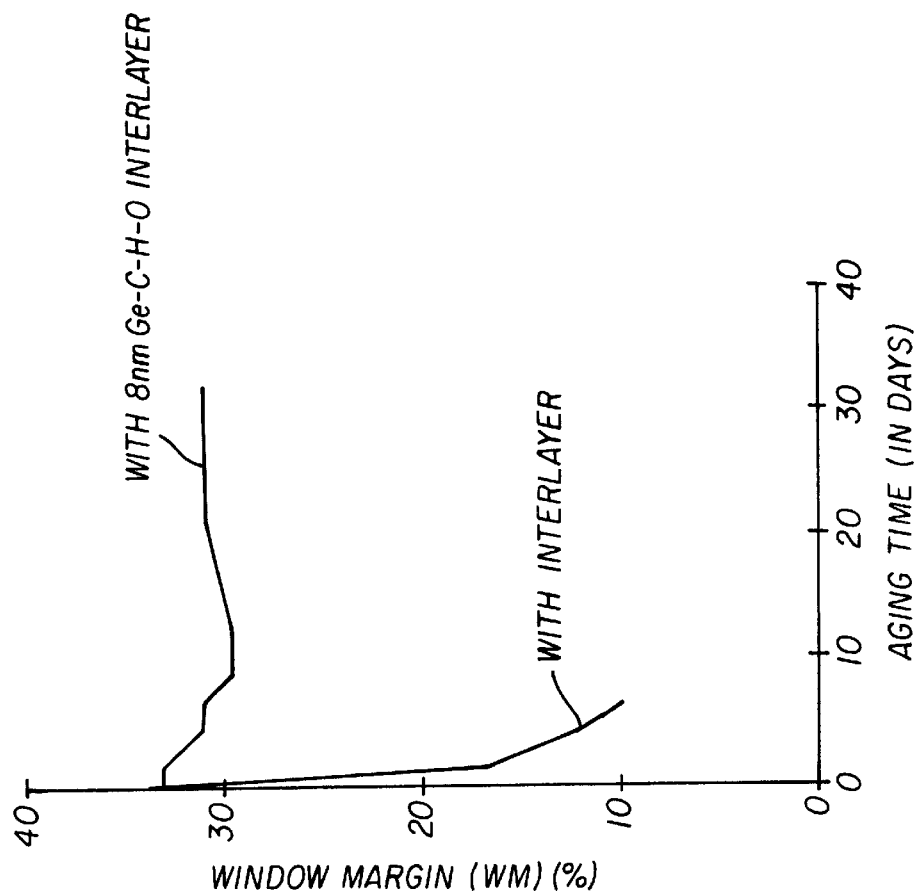
FIG. 4 is a plot of Window Margin vs. aging time using of 8 nm thick Ge—C—H interlayer; accelerated aging test was carried out at 95° C.

FIG. 4 shows the window margin of the disks using silver metal reflector with 8 nm of Ge—C—H interlayer as a function aging time. The test was carried out at 95° C. Figure also shows the window margin for silver disk without an interlayer for a comparison. The use of thin inter layers of Ge—C—H significantly improved the stability of the recorded data on the disk using silver reflector.

Figure 6:
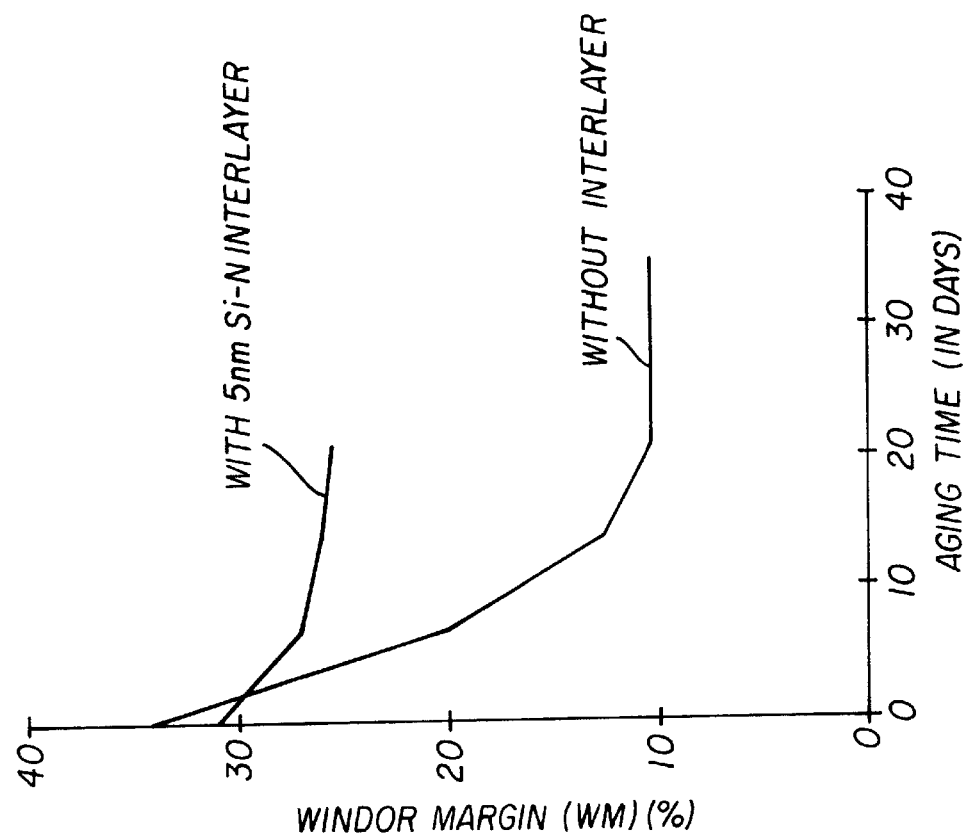
FIG. 6 is a plot similar to FIG. 5 but for a 5 nm thick Si—N interlayer.
Figure 5:
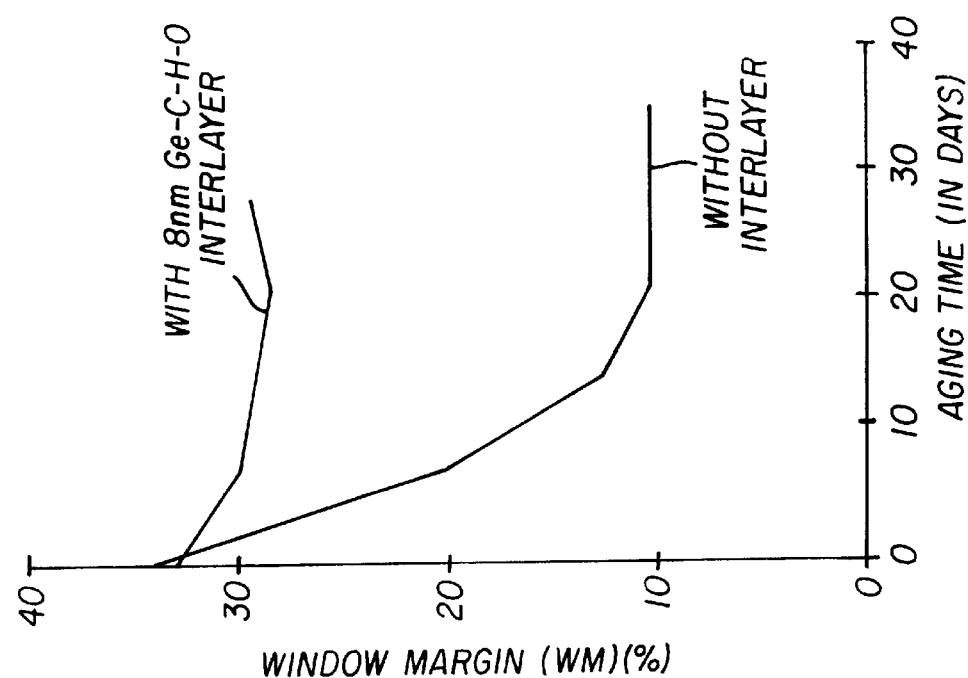
FIG. 5 is a plot of Window Margin vs. aging time using an 8 nm thick Ge—C—H interlayer; accelerated aging test was carried out at 80° C. and 85% relative humidity.
Figure 7:
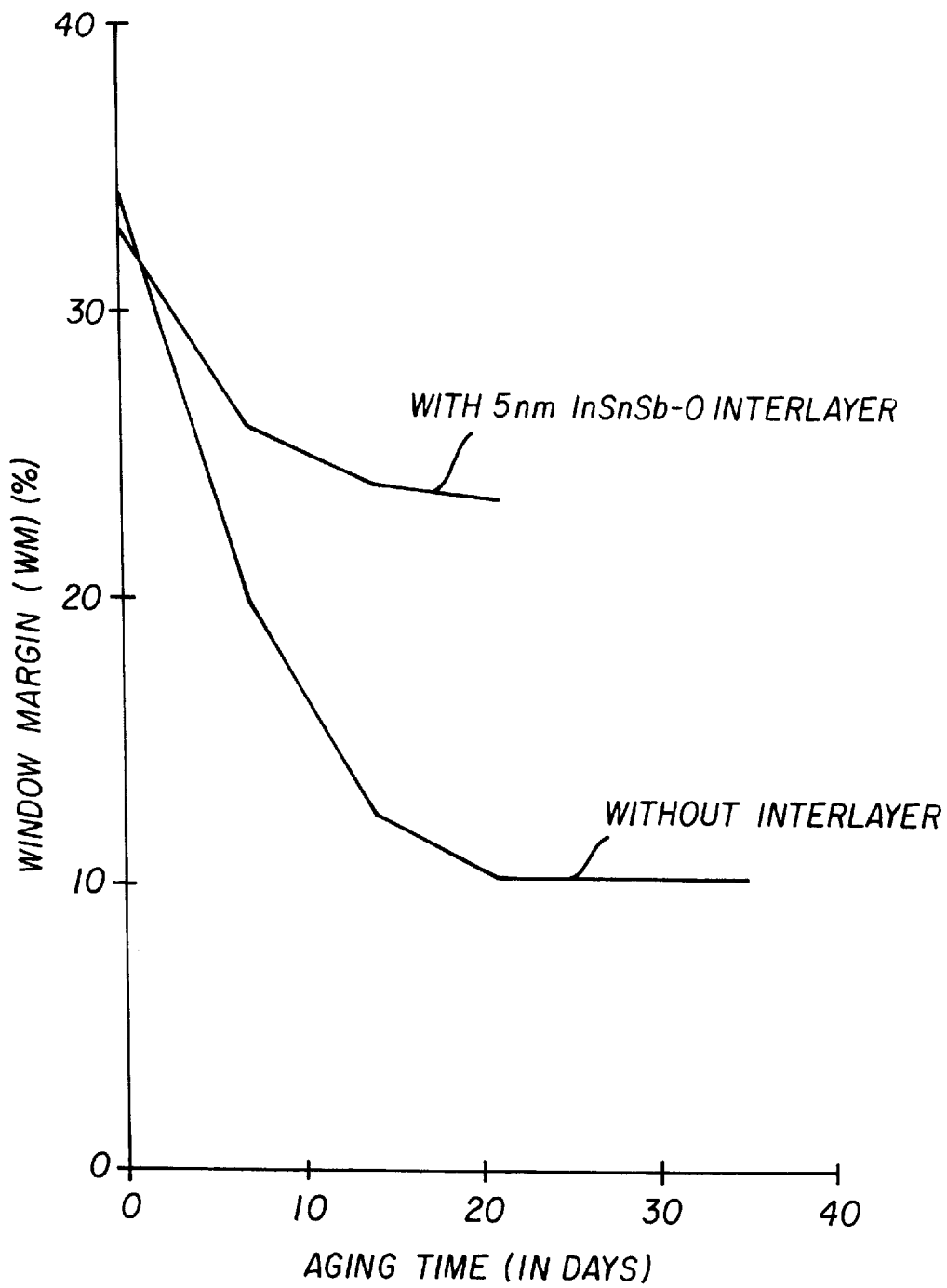
FIG. 7 is another plot similar to FIG. 5 but for a 5 nm thick InSnSb—O interlayer.

FIG. 5 shows the window margin of the disks using silver metal reflector with 8 nm of Ge—C—H interlayer as a function aging time. The test was carried out at 80° C. and 85% RH conditions. Thus the use of thin inter layers of Ge—C—H alloy improved the stability of the CD-R disk under both dry heat and wet accelerated conditions. Similarly, FIGS. 6 and 7 show the improved environmental stability of the CD-R disk using Si—N and InSnSb—O, interlayers of 5 nm thickness, respectively.

Thus the above data demonstrates that the CD-R disks with high reflectivity, high performance and high data stability can be prepared using thin interlayers of Ge—C—H, Si—N and InSnSb—O and the silver reflecting layer. Thin layers of these dielectrics are stable and form an effective barrier and prevent/reduce the interaction between the dye recording layer and the silver reflector.

To further improve the extended environmental stability of the above disks, stable alloys of silver metal reflector such as Ag—Pd, Ag—Cu, and Ag—Ni can be used instead of pure silver as a reflecting layer. The alloying addition of 2–5% Pd, Cu, or Ni into Ag metal was found to increase the environmental stability of the silver reflector.

To further improve the stability of the disk structure and protect silver metal or silver alloys from corrosion/oxidation a thin protective layer of metal such as Pd, Cr, Ni, etc. or a thin layer of dielectric such as Ge—C—H, Si—N and InSnSb—O may be deposited on the reflector layer 30 before overcoating the disk with an UV-curable protective lacquer.

The invention has been described in detail with particular reference to certain preferred embodiments thereof, but it will be understood that variations and modifications can be effected within the spirit and scope of the invention.

PARTS LIST

10 substrate
20 dye recording layer
25 dielectric interlayer
30 reflecting layer
35 lacquer protective overcoat

What is claimed is:

1. A recordable optical disk comprising:
   a) a transparent substrate;
   b) a recording layer formed over the substrate;
   c) a reflective layer formed over the recording layer;
   d) a thin dielectric interlayer formed on the recording layer at the interface between the reflective layer and the recording layer wherein the thin dielectric interlayer includes materials selected from the group consisting of transparent dielectrics Ge—C—H, Si—N and InSnSb—O and alloys thereof, the interlayer being selected so as to improve the optical disk recording stability without significantly affecting the reflection of a recording light beam passing through the substrate and the recording layer and which is reflected by the reflective layer; and
   (e) a metal protective overcoat layer formed on the reflective layer.

2. The recordable optical disk of claim 1 wherein the thin dielectric interlayer includes materials selected from the group consisting of Ge—C—H, Si—N and InSnSb—O.

3. The recordable optical disk of claim 1 wherein when the thin dielectric interlayer or alloys thereof has a thickness in a range between 1 nm to 30 nm.

4. A recordable optical disk comprising:
   a) a transparent substrate;
   b) a recording layer formed over the substrate;
   c) a reflective layer which includes silver or silver alloys formed over the recording layer; and
   d) a thin dielectric interlayer which includes materials selected from the group consisting of Ge—C—H, Si—N and InSnSb—O, or alloys thereof formed on the recording layer at the interface between the reflective layer and the recording layer and selected to have a thickness in a range between 0.2 nm to 3 nm so as to improve the optical disk recording stability without significantly affecting the reflection of a recording light beam passing through the substrate and the recording layer and which is reflected by the reflective layer.

5. A recordable optical disk comprising:
   a) a transparent substrate;
   b) a recording layer formed over the substrate;
   c) a reflective layer formed over the recording layer;
   d) a thin dielectric interlayer formed on the recording layer at the interface between the reflective layer and the recording layer wherein the thin dielectric interlayer includes materials selected from the group consisting of transparent dielectrics Ge—C—H, Si—N and InSnSb—O and alloys thereof, the interlayer being selected so as to improve the optical disk recording stability without significantly affecting the reflection of a recording light beam passing through the substrate and the recording layer and which is reflected by the reflective layer; and
   (e) a metallic layer formed on the reflective layer and a UV-curable lacquer overcoat layer formed on the metallic layer.

* * * * *